(12) United States Patent
Grigsby et al.

(10) Patent No.: US 7,961,080 B2
(45) Date of Patent: Jun. 14, 2011

(54) SYSTEM AND METHOD FOR AUTOMOTIVE IMAGE CAPTURE AND RETRIEVAL

(75) Inventors: Travis M. Grigsby, Austin, TX (US);
Steven M. Miller, Cary, NC (US); Lisa A. Seacat, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 11/947,556

(22) Filed: Nov. 29, 2007

(65) Prior Publication Data
US 2009/0144233 A1  Jun. 4, 2009

(51) Int. Cl.
*B60Q 1/00* (2006.01)
*B60Q 1/48* (2006.01)
*G08G 1/123* (2006.01)
*G01C 21/30* (2006.01)
*H04N 7/18* (2006.01)

(52) U.S. Cl. ............... 340/425.5; 340/932.2; 340/995.1; 340/995.24; 701/211; 348/148

(58) Field of Classification Search .................. None
See application file for complete search history.

(56) References Cited

U.S. PATENT DOCUMENTS

| 3,141,393 | A | 7/1964 | Platt |
| 2008/0051997 | A1 * | 2/2008 | Rosenberg .................... 701/211 |
| 2009/0251333 | A1 * | 10/2009 | Itani et al. .................. 340/932.2 |
| 2009/0295921 | A1 * | 12/2009 | Fujita ............................ 348/148 |

OTHER PUBLICATIONS

Duncan Graham-Rowe, "Clever Cars Can Read Road Signs," WWW.NEWSCIENTIST.COM/ARTICLE.NS?ID=DN6454 &PRINT=TRUE, Sep. 30, 2004.
Mike Adams, "New Automobile Technology Will Read Road Signs and Serve as Digital Back Seat Driver," WWW.NEWSTARGET.COM/Z002146.HTML, Oct. 5, 2004.
Timothy, "A Car Navigation System That Takes Pictures," HTTP://HARDWARE.SLASHDOT.ORG/ARTICLE.PL?SID=06/06/29/1221208, Jun. 29, 2006.

* cited by examiner

*Primary Examiner* — Julie Lieu
(74) *Attorney, Agent, or Firm* — Dillon & Yudell LLP

(57) ABSTRACT

A system and method for implementing automotive image capture and retrieval. An image manager receives an image from a vehicle-mounted camera. The image manager determines, based on a set of preferences, whether to store the image. In response to storing the image, the image manager associates at least one form of metadata with the image, wherein the at least one form of metadata includes global positioning system (GPS) coordinates at the time of image capture, speed of a vehicle at the time of image capture, direction of travel at the time of image capture, and user annotations. In response to receiving a query for the image, image manager presents the image to a user.

12 Claims, 4 Drawing Sheets

SYSTEM AND METHOD FOR AUTOMOTIVE IMAGE CAPTURE AND RETRIEVAL

BACKGROUND OF THE INVENTION

1. Technical Field

The present invention relates in general to the field of data processing systems and in particular, to the field of storing and retrieving data utilizing data processing systems.

2. Description of the Related Art

One of the latest trends in the automotive industry involves the increased utilization of data processing systems (e.g., computers) to control functions within automobiles. Many of these computer-controlled functions include drive-by-wire, global positioning systems (GPS), and automatic climate control. These computers automate functions that previously required the active attention of the driver. Computer-controlled functions free the driver's attention and enable the driver to fully concentrate on the road ahead.

The present invention includes a system and method for implementing automotive image capture and retrieval. An image manager receives an image from a vehicle-mounted camera. The image manager determines, based on a set of preferences, whether to store the image. In response to storing the image, the image manager associates at least one form of metadata with the image, wherein the at least one form of metadata includes global positioning system (GPS) coordinates at the time of image capture, speed of a vehicle at the time of image capture, direction of travel at the time of image capture, and user annotations. In response to receiving a query for the image, image manager presents the image to a user.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will be best be understood by reference to the following detailed description of an illustrative embodiment when read in conjunction with the accompanying figures, wherein:

DETAILED DESCRIPTION OF AN EMBODIMENT

Figure 1:
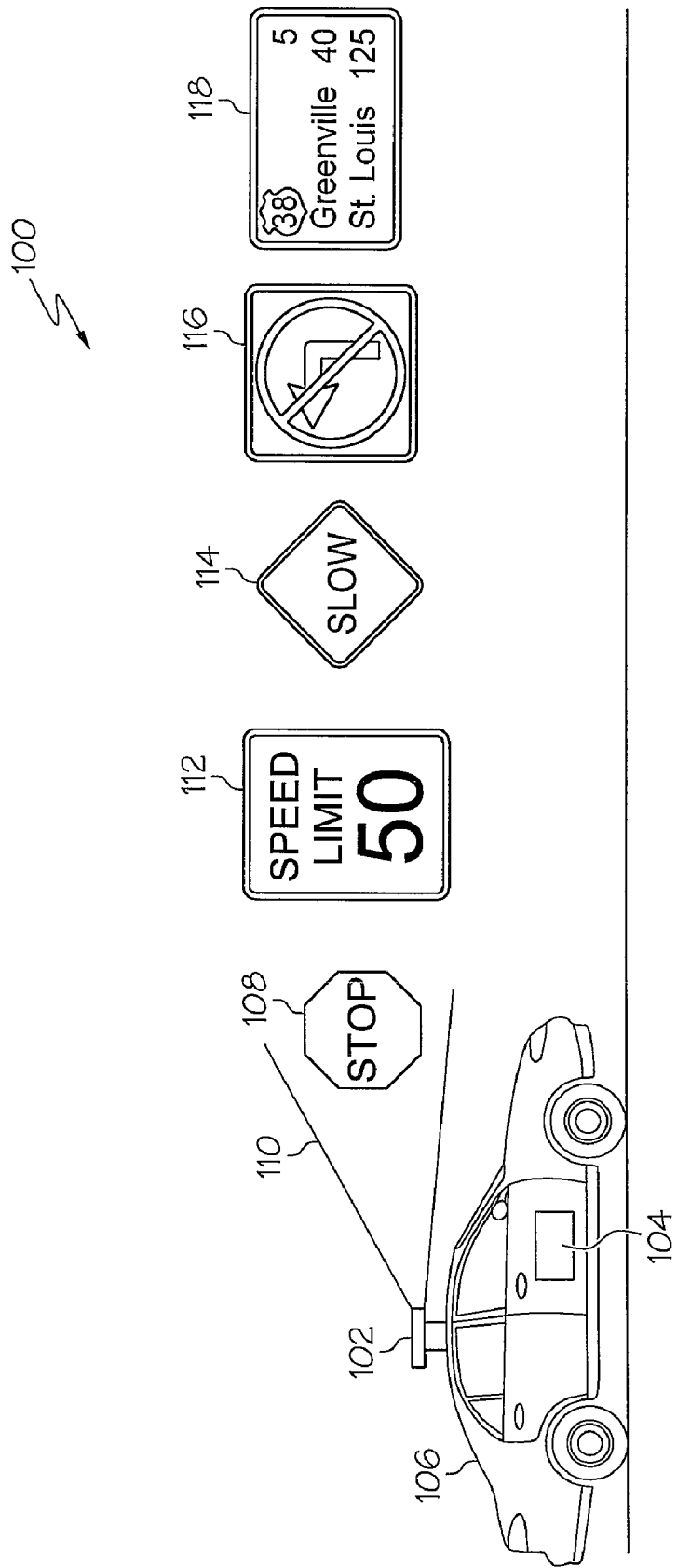
FIG. 1 is a block diagram of a system in which an embodiment of the present invention may be implemented.

FIG. 1 is a block diagram illustrating an exemplary system 100 according to an embodiment of the present invention. As shown, system 100 includes vehicle 106, which may be implemented by any type of vehicle including but not limited to: cars, trucks, motorcycles, mass transit vehicles, and the like. Vehicle 100 further includes a camera 102, which is coupled to and controlled by vehicle controller 106, which is discussed herein in more detail in conjunction with FIG. 2. Those with skill in the art will appreciate that camera 102 may be implemented by any type of camera and may be mounted in any location of vehicle 100.

As depicted, camera 102 captures images of landmarks 108, 112, 114, 116, and 118 within field of view 110. In an embodiment of the present invention, a user may specify the types of landmarks desired for image capture. FIG. 1 illustrates landmarks 108, 112, 114, 116, and 118 as street signs, but those with skill in the art will appreciate that landmarks 108, 112, 114, 116, and 118 may be implemented as any type of landmark including, but not limited to: buildings, monuments, geographic features, and the like.

Figure 2:
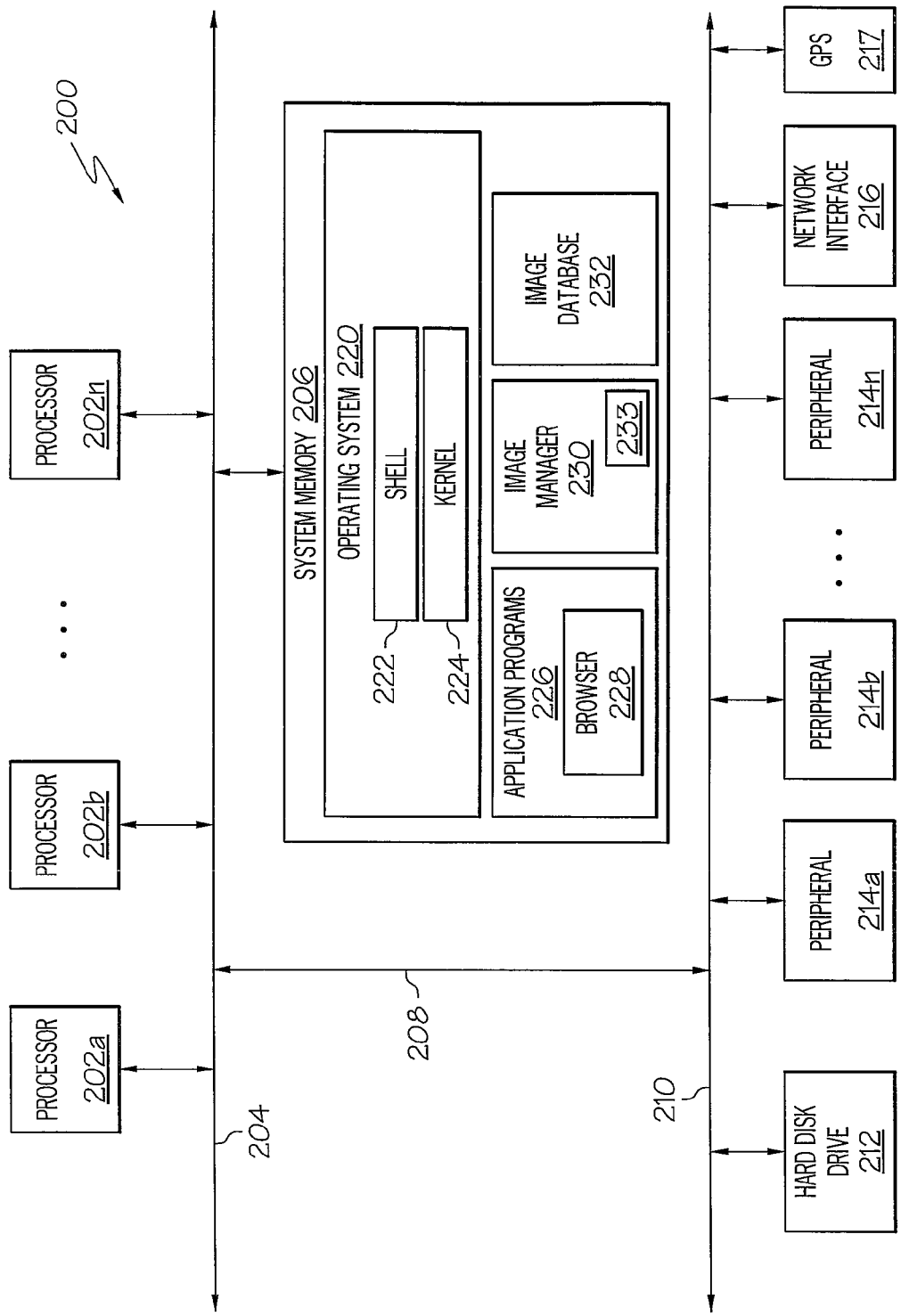
FIG. 2 is a block diagram of a data processing system in which an embodiment of the present invention may be implemented.

FIG. 2 is a block diagram depicting an exemplary data processing system 200, which may be utilized to implement vehicle computer 106 as shown in FIG. 1. As illustrated, exemplary data processing system 200 includes a collection of processors 202a-202n that are coupled to a system memory 206 via a system bus 204. System memory 206 may be implemented by dynamic random access memory (DRAM) modules or any other type of random access memory (RAM) module. Mezzanine bus 208 couples system bus 204 to peripheral bus 210. Coupled to peripheral bus 210 is a hard disk drive 212 for mass storage and a collection of peripherals 214a-214n, which may include, but are not limited to, optical drives, other hard disk drives, printers, and input devices, and the like. Network interface 216 enables data processing system 200 to communicate on a network, such as, but not limited to the Internet or any other type of network. Global positioning system (GPS) unit 217, discussed herein in more detail in conjunction with FIGS. 3-4, enables satellite tracking of various characteristics of vehicle 106 such as, but not including location, speed and acceleration.

Included in system memory 206 is operating system 220, which further includes a shell 222 (as it is called in the UNIX® operating system. UNIX® is a registered trademark of The Open Group in the United States and other countries), for providing transparent user access to resources such as application programs 226. Generally, shell 222, also called a command processor in Microsoft® Windows® operating system, is generally the highest level of the operating system software hierarchy ad serves as a command interpreter. Microsoft® and Windows® are trademarks of Microsoft Corporation in the United States, other countries, or both. Shell 222 provides a system prompt, interprets commands entered by keyboard, mouse, or other input media, and sends the interpreted command(s) to the appropriate lower levels of the operating system (e.g., kernel 224) for processing. Note that while shell 222 is a text-based, line-oriented user interface, the present invention will support other user interface modes, such as graphical, voice, gestural, etc. equally well.

As illustrated, operating system 220 also includes kernel 224 which includes lower levels of functionality for operating system 220 and application programs 226, including memory management, process and task management, disk management, and mouse and keyboard management. Application programs 226 may include a browser 228 or any other type of user-interface (UI) program to enable a user to control functions within vehicle 106 including, but not limited to: climate control, entertainment (e.g., radio, video, external media player, etc.), and cellular phone control, and the like.

Also included in system memory 206 are image manager 230 and image database 232. Image manager 230 includes preferences 233, which may be set by default by a manufacturer or set by the user, that dictate the types of landmark images the user would like to collect. As discussed herein in more detail in conjunction with FIGS. 3-4, image manager 230 specifies the types of landmarks (through preferences 233) that require image capture by camera 102. For example, depending on the settings (specified by a user or by default) set within image manager 230, some landmarks that require image capture may include certain road signs, buildings, etc.

Those with skill in the art will appreciate that image manager 230 may utilize any type of image recognition methods to determine which landmarks require image capture. After camera 102 and image manager 230 capture an image, the image is stored within image database 232, along with associated metadata, if any, for later recall. The associated metadata may include, but is not limited to: GPS position coordinates of the landmark taken from GPS unit 217, the time the image was captured, and the speed of the vehicle at the time of image capture, direction of travel, road name or other identifier, current road-location marker, any voice or other user annotations. In an embodiment of the present invention, voice annotations (or other user annotations) may be entered at the time of image capture or added at some future time after capture to convey other personalized data associated by the user with the landmark/signage.

Figure 3:
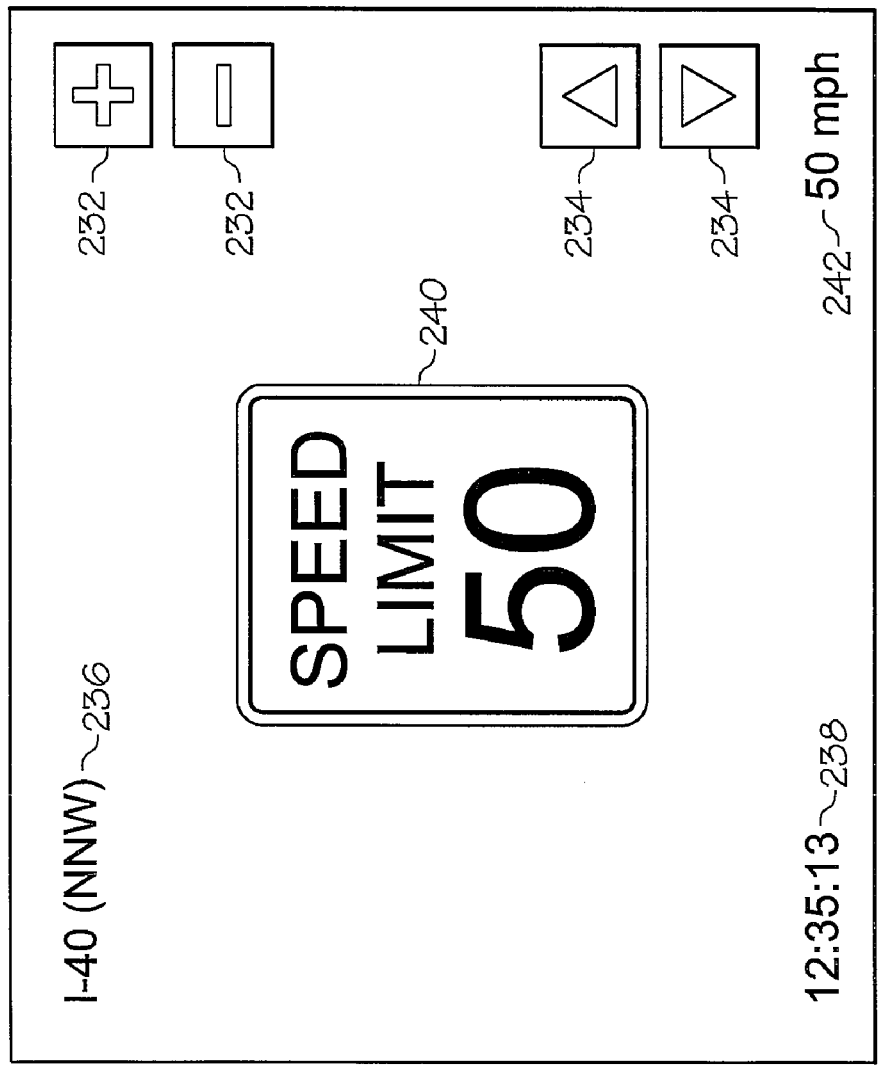
FIG. 3 is a pictorial representation of a user interface of an image manager as illustrated in FIG. 2.

FIG. 3 is a pictorial representation of a user interface (UI) 300 of browser 228 that enables a user to interact with image manager 230 according to an embodiment of the present invention. As illustrated, UI 300 includes image selectors 232 that enable a user to cycle through the images captured by camera 102. Function selectors 234 enables a user to select views on UI 300 between captured images, a map view with graphical indicators that indicate the location of where each capture image was taken, or other views including, but not limited to: radio selection menus, video selection menus, and cellular call menus, etc. Location, time, and speed displays 236, 238, and 242 display metadata associated with image 240 such as the location of where the image was taken, the time when the image was taken, and the speed of the vehicle at the time of image capture.

Figure 4B:
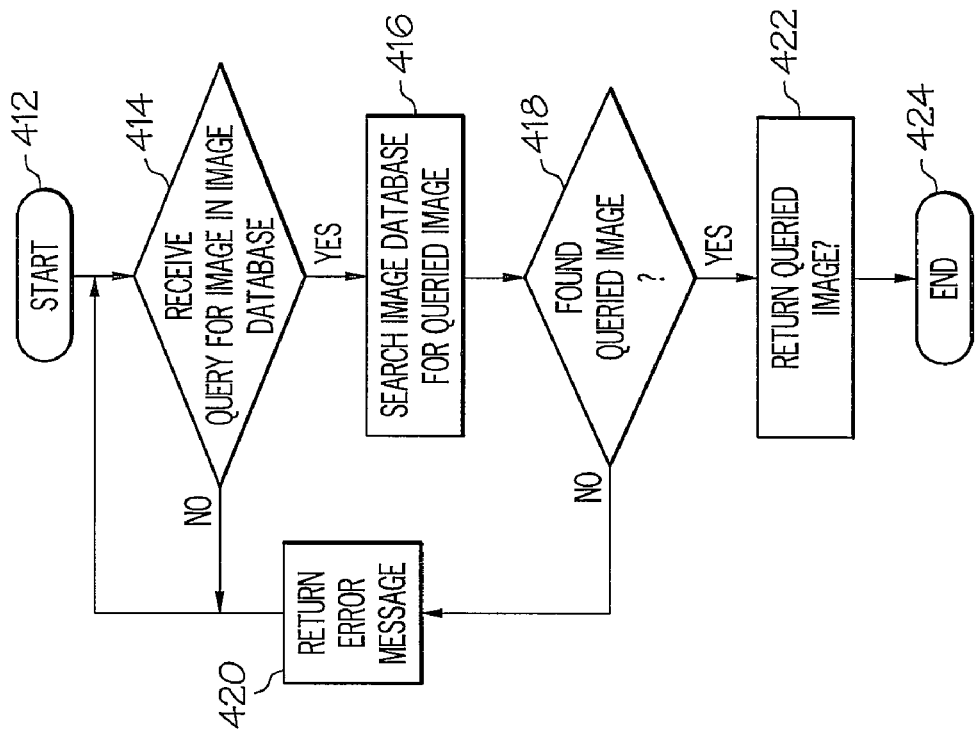
FIGS. 4A-4B are high-level logical flowcharts illustrating an exemplary method for implementing automotive image capture and retrieval according to an embodiment of the present invention.
Figure 4A:
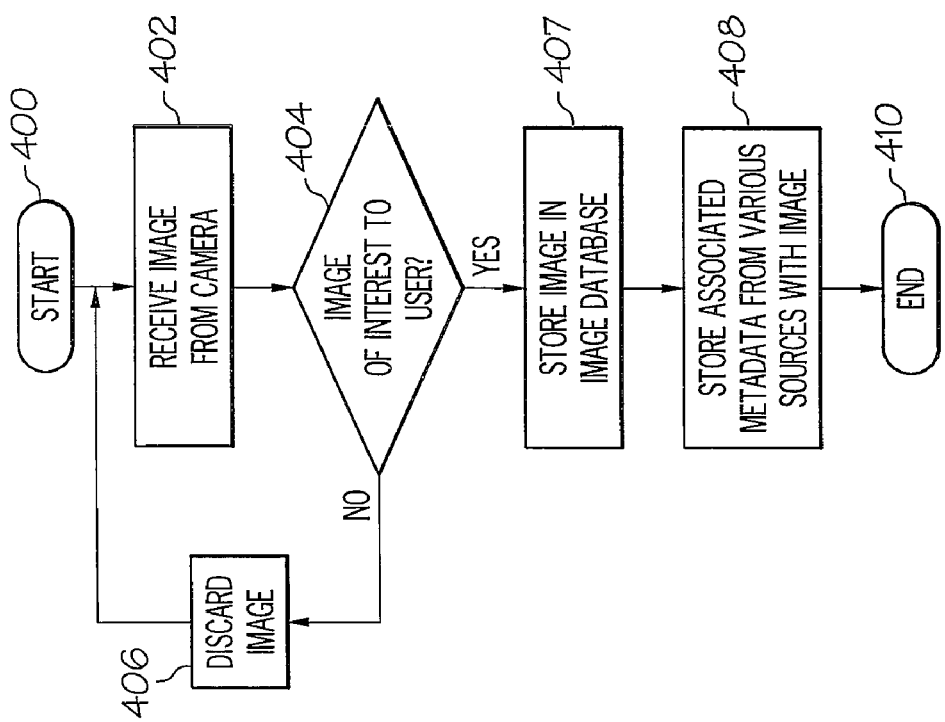

FIGS. 4A-4B are high-level logical flowcharts illustrating an exemplary method for implementing automotive image capture and retrieval according to an embodiment of the present invention. Referring to FIG. 4A, the process begins at step 400 and proceeds to step 402, which depicts image manager 230 receiving an image from camera 102. The process continues to step 404, which shows image manager 230 determining if the received image is of interest to the user. As previously discussed, image manager 230 includes preferences 233, which may be set by default by a manufacturer or set by the user, that dictate the types of landmark images the user would like to collect. If the received image does not match any of the preferences in preferences 233, the image is discarded by image manager 230, as illustrated in step 406. The process returns to step 402.

Returning to step 404, if image manager 230 determines that the received image is of interest to the user, image manager 230 stores the image in image database 232, as illustrated in step 407. The process continues to step 408, which depicts image manager 230 storing associated metadata from various sources with the received image in image database 232. As previously discussed, image manager 230 may access GPS 217 to determine the location in which the received image was taken and store that information in conjunction with the received image. Other metadata may include the speed of the vehicle at the time of image capture (taken from a speedometer reading) and the direction that the vehicle is facing at the time of image capture (taken from a compass reading). The process ends, as depicted in step 410.

FIG. 4B is a high-level logical flowchart illustrating an exemplary method for image retrieval according to an embodiment of the present invention. The process begins at step 412 and continues to step 414, which depicts image manager 230 determining if an image query has been received. As previously discussed, a user may access UI 300 to query for a particular image. If no query is received, the process iterates at step 414.

If a query is received, the process continues to step 416, which shows image manager 230 searching image database 232 for the queried image. If the queried image is not found (step 418), the process continues to step 420, which depicts image manager 230 returning an error message to the user indicating that the queried image was not found in image database 232. If the queried image is found, the process continues to step 422, which illustrates image manager 230 presenting the queried image and associated metadata (if any) to the user via UI 300. The process ends, as illustrated at step 414.

As discussed, the present invention includes a system and method for implementing automotive image capture and retrieval. An image manager receives an image from a vehicle-mounted camera. The image manager determines, based on a set of preferences, whether to store the image. In response to storing the image, the image manager associates at least one form of metadata with the image, wherein the at least one form of metadata includes global positioning system (GPS) coordinates at the time of image capture, speed of a vehicle at the time of image capture, direction of travel at the time of image capture, and user annotations. In response to receiving a query for the image, image manager presents the image to a user.

It should be understood that at least some aspects of the present invention may alternatively be implemented in a computer-usable medium that contains a program product. Programs defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to random access memory (RAM), and communication media, such as computer networks and telephone networks, including Ethernet, the Internet, wireless networks, and like networks. It should be understood, therefore, that such signal-bearing media, when carrying or encoding computer-readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made herein without departing from the spirit and scope of the invention.

What is claimed is:

1. A computer-implementable method for implementing automotive image capture and retrieval, said computer-implementable method comprising: receiving an image from a vehicle-mounted camera; in response to receipt of said image, determining, based on a set of pre-established preferences, whether to store said image; when the image does not fit the set of preferences, discarding the image; in response to storing said image, associating metadata with said image, wherein said metadata includes a time of image capture, global positioning system (GPS) coordinates at a time of image capture, speed of a vehicle at said time of image capture, direction of travel at said time of image capture, and user annotations; and in response to receiving a query for said image, searching an image database for the image and presenting said image to a user along with associated metadata;

wherein the images are landmarks and the set of preferences includes user specified types of landmarks desired for image capture, said method comprising: receiving one or more user specified types of landmarks for image capture; and storing the one or more user specified types of landmarks as preferences.

2. The computer-implementable method according to claim 1, wherein said user annotations further comprises voice annotations describing said image, wherein said voice annotations is entered at the time of image capture or at a future time after image capture and conveys personalized data associated by the user with the captured image.

3. The computer-implementable method according to claim 1, wherein said at least one form of metadata further comprises a road name at location of image capture and a most recent road-location marker passed by said vehicle at image capture.

4. A system for implementing automotive image capture and retrieval, said system comprising: at least one processor; an interconnect coupled to said at least one processor; a computer-readable storage medium, coupled to said at least one processor via said interconnect, said computer-readable storage medium further including computer-executable instructions executable by said at least one processor and configured for: receiving an image from a vehicle-mounted camera; in response to receipt of said image, determining, based on a set of pre-established preferences, whether to store said image; when the image does not fit the set of preferences, discarding the image; in response to storing said image, associating metadata with said image, wherein said metadata includes a time of image capture, global positioning system (GPS) coordinates at a time of image capture, speed of a vehicle at said time of image capture, direction of travel at said time of image capture, and user annotations; and in response to receiving a query for said image, searching an image database for the image and presenting said image to a user along with associated metadata;

wherein the images are landmarks and the set of preferences includes user specified types of landmarks desired for image capture, and said computer-executable instructions are further configured for: receiving one or more user specified types of landmarks for image capture; and storing the one or more user specified types of landmarks as preferences.

5. The system according to claim 4, wherein said user annotations further comprises voice annotations describing said image, wherein said voice annotations is entered at the time of image capture or at a future time after image capture and conveys personalized data associated by the user with the captured image.

6. The system according to claim 4, wherein said at least one form of metadata further comprises a road name at location of image capture and a most recent road-location marker passed by said vehicle at image capture.

7. The computer-implementable method according to claim 1, further comprising: receiving as selection through a user interface of an image selected by an image selector that enables a user to cycle through images captured by camera; and enabling user selection via a function selector on the user interface of one or more views on the user interface of captured images, wherein the one or more views are selected from among (a) a map view with graphical indicators that indicate the location of where each capture image was taken and (b) other views including, radio selection menus, video selection menus, and cellular call menus; and presenting one or more of location, time, and speed displays, which display metadata associated with the captured image, including the location of where the image was taken, the time when the image was taken, and the speed of the vehicle at the time of image capture.

8. The system according to claim 4, wherein said computer-executable instructions are further configured for: receiving as selection through a user interface of an image selected by an image selector that enables a user to cycle through images captured by camera; and enabling user selection via a function selector on the user interface of one or more views on the user interface of captured images, wherein the one or more views are selected from among (a) a map view with graphical indicators that indicate the location of where each capture image was taken and (b) other views including, radio selection menus, video selection menus, and cellular call menus; and presenting one or more of location, time, and speed displays, which display metadata associated with the captured image, including the location of where the image was taken, the time when the image was taken, and the speed of the vehicle at the time of image capture.

9. A computer program product comprising a non-transitory computer readable storage medium and computer-executable instructions on the computer readable storage medium and configured for performing the method of claim 1.

10. A computer program product comprising a non-transitory computer readable storage medium and computer-executable instructions on the computer readable storage medium and configured for performing the method of claim 2.

11. A computer program product comprising a non-transitory computer readable storage medium and computer-executable instructions on the computer readable storage medium and configured for performing the method of claim 3.

12. A computer program product comprising a non-transitory computer readable storage medium and computer-executable instructions on the computer readable storage medium and configured for performing the method of claim 7.

* * * * *